(12) United States Patent
Bretagnol et al.

(10) Patent No.: US 11,667,267 B2
(45) Date of Patent: Jun. 6, 2023

(54) DEVICE FOR CLEANING THE OPTICAL SURFACE OF AN OPTICAL SENSOR FOR A MOTOR VEHICLE AND ASSOCIATED METHOD

(71) Applicant: Valeo Systèmes d'Essuyage, Le Mesnil Saint Denis (FR)

(72) Inventors: Frédéric Bretagnol, Issoire (FR); Giuseppe Grasso, Issoire (FR); Marcel Trebouet, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 201 days.

(21) Appl. No.: 16/471,908

(22) PCT Filed: Nov. 29, 2017

(86) PCT No.: PCT/EP2017/080875
§ 371 (c)(1),
(2) Date: Jun. 20, 2019

(87) PCT Pub. No.: WO2018/114262
PCT Pub. Date: Jun. 28, 2018

(65) Prior Publication Data
US 2019/0315316 A1    Oct. 17, 2019

(30) Foreign Application Priority Data
Dec. 21, 2016   (FR) ........................... 1662969

(51) Int. Cl.
*B08B 7/00* (2006.01)
*B60S 1/56* (2006.01)
*G02B 27/00* (2006.01)

(52) U.S. Cl.
CPC .............. *B60S 1/56* (2013.01); *B08B 7/0042* (2013.01); *G02B 27/0006* (2013.01)

(58) Field of Classification Search
None
See application file for complete search history.

(56) References Cited

U.S. PATENT DOCUMENTS 4,900,891 A * 2/1990 Vega ..................... B08B 7/0042
219/121.6
5,151,134 A * 9/1992 Boquillon .......... B23K 26/1462
134/1

(Continued)

FOREIGN PATENT DOCUMENTS

DE          10208485       *  9/2003
DE       102014200097 A1    7/2015
FR          3027008 A1      4/2016

OTHER PUBLICATIONS

Translation of DE10208485 by Dyja et al., published Sep. 4, 2003.*

(Continued)

*Primary Examiner* — Mikhail Kornakov
*Assistant Examiner* — Ryan L Coleman
(74) *Attorney, Agent, or Firm* — Osha Bergman Watanabe & Burton LLP

(57) ABSTRACT

The invention concerns a device (100) for cleaning the optical surface (162) of at least one optical sensor (160) for a motor vehicle. The cleaning device (100) includes a source (110) for emitting a laser beam and means for guiding the laser beam onto at least a part of the optical surface (162) of an optical sensor (160) so as to clean it.

13 Claims, 4 Drawing Sheets

(56) References Cited

U.S. PATENT DOCUMENTS

| 5,882,487 A | * | 3/1999 | Li | G21F 9/005 |
| | | | | 204/157.41 |
| 2006/0144834 A1 | * | 7/2006 | Denney | B23K 26/032 |
| | | | | 219/121.84 |
| 2013/0048036 A1 | * | 2/2013 | Jonas | B60S 1/56 |
| | | | | 134/167 R |
| 2015/0218746 A1 | * | 8/2015 | Clowes | B23K 26/0622 |
| | | | | 250/492.1 |
| 2015/0323872 A1 | * | 11/2015 | Van De Kerkhof | |
| | | | | G03F 7/70575 |
| | | | | 355/71 |
| 2016/0158817 A1 | * | 6/2016 | Zediker | C10G 75/00 |
| | | | | 134/1 |

OTHER PUBLICATIONS

International Search Report and Written Opinion issued in corresponding PCT Application No. PCT/EP2017/080875, dated Feb. 5, 2018 (10 Pages with English Translation of International Search Report).

* cited by examiner

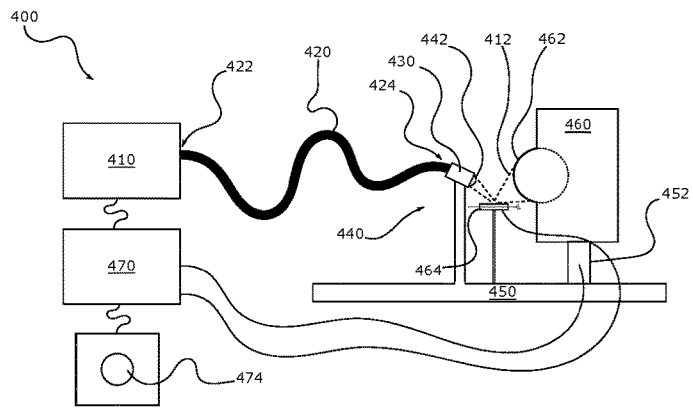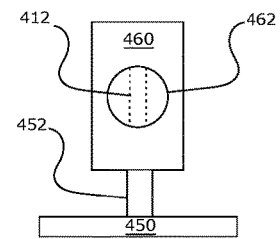
Figure 5　　　　　　　　Figure 6
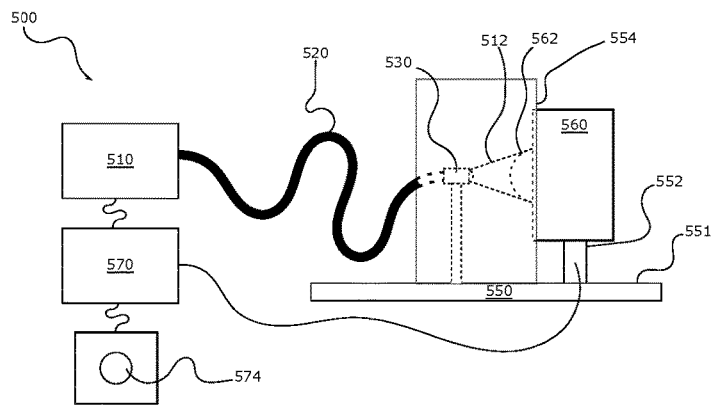
Figure 7
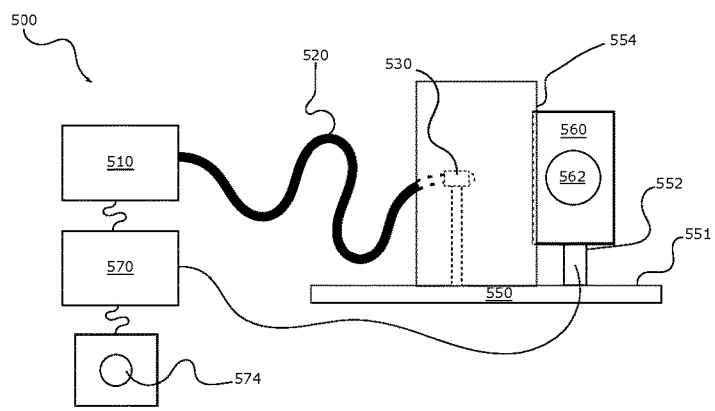
Figure 7A

DEVICE FOR CLEANING THE OPTICAL SURFACE OF AN OPTICAL SENSOR FOR A MOTOR VEHICLE AND ASSOCIATED METHOD

The technical field of the invention is that of devices for cleaning optical sensors for motor vehicles, and more particularly for cleaning the optical surface of this kind of sensor.

Optical sensors are increasingly used to assist the driver of a motor vehicle in their driving. For example, an optical sensor may be placed at the rear of the vehicle in order to enable the driver to have a more comfortable view of obstacles located behind the vehicle when they execute parallel parking. The optical sensors are therefore generally placed on the outside of the vehicle, exposed to inclement weather and to dust. Over time a layer of dirt is formed on the optical surface of the sensor, partially or completely blocking the detection field of the sensor. It then proves necessary to clean the optical surface of the sensor regularly to enable it to fulfill its function.

At present, the optical surfaces of the sensors are cleaned with the aid of an aqueous solution sprayed under pressure in order to detach the dirt from the sensor. Depending on the nature of the dirt, a greater or lesser quantity of aqueous solution will have to be used with an uncertain result. In fact, some types of dirt, such as for example mud or insect remains, may necessitate intervention of the driver to remove manually the most adherent elements. Also, given the quantity of liquid consumed by this type of device, a large quantity of aqueous solution has to be stored in and transported by the motor vehicle. Integrating a tank for this purpose is difficult in motor vehicles where saving space is of primary importance. Also, storing the aqueous solution increases the weight of the vehicle, which is reflected in a significant drop in the range of the vehicle.

There is therefore a need for a device for cleaning the optical surface of an optical sensor for a motor vehicle that is simpler to use, lighter in weight and easier to integrate.

To this end, the invention proposes a device for cleaning the optical surface of at least one optical sensor for a motor vehicle, characterized in that it includes a source for emitting a laser beam and means for guiding the laser beam onto at least a part of the optical surface of the at least one sensor so as to clean the optical surface.

The source for emitting a laser beam is advantageously less bulky and lighter than a water tank as usually employed for cleaning the optical surface of an optical sensor. Because of this, the invention enables easier integration of the cleaning device into a motor vehicle whilst making it possible to limit its impact on the range of the vehicle.

The source for emitting the laser beam may in particular be configured as a function of the nature of the dirt that it is wished to remove from the optical surface. The wavelength of the laser beam can therefore be adapted as a function of the absorption properties of the layer of dirt in order to favor optimum absorption of the laser beam. The laser beam may in particular have a wavelength between 200 nm and 1 200 nm inclusive, any value in this range of wavelengths enabling action of the laser beam on mud for example or salt. For example, preference may be given to obtaining a wavelength of the laser beam between 280 nm and 380 nm to deal with proteins and between 450 nm and 600 nm to deal with hemoglobin in the case of removing insects present on the optical surface.

The means for guiding the laser beam may in particular include an optical fiber a first end of which is optically coupled to the source for emitting the beam and a second end of which is directed toward the optical sensor or sensors. Using an optical fiber allows greater freedom in the arrangement of the emission source relative to the optical sensor, thereby facilitating its integration into different zones of a motor vehicle. Furthermore, using an optical fiber also enables easier confinement of the laser beam emitted by the emission source.

According to one feature of the invention, the guide means include a device for shaping the laser beam emitted by the emission source on at least a part of the optical surface of the optical sensor. The shaping device aims to transmit, reflect and/or refract the laser beam so as to make it possible to illuminate at least a part of the optical surface of the sensor. In order to enable execution of the invention using many existing optical sensors, the shaping device is preferably arranged outside the optical sensor. Nevertheless, integrating the shaping device into the optical sensor, in order to offer an even more compact cleaning device, may be envisaged. The shaping device may include at least one lens and/or one concave surfacing reflecting the laser beam in the direction of the optical surface of the optical sensor.

According to another feature of the invention, the cleaning device includes an end piece for emitting the laser beam and first means for moving the relative position of the emission end piece with respect to the optical surface of the at least one optical sensor. Here by the term emission end piece is meant the end of the guide means from which the laser beam is emitted. In particular, in the case of transmission of the beam from the emission source via an optical fiber, the emission end piece is mounted at the second end of that fiber.

The first movement means may be configured to move the end piece and/or the optical surface reversibly between a passive position in which the end piece does not face the optical surface and an active position in which the end piece faces the optical surface to be cleaned. In one embodiment of the invention, the first movement means are configured at least to pivot the optical surface of the optical sensor while the end piece remains immobile. In another embodiment of the invention, the first movement means are configured to modify the position of the emission end piece while the optical sensor remains immobile. For example, the first movement means may be a telescopic and/or articulated arm adapted to move the end of an optical fiber on which the end piece is located.

According to another feature of the invention, the cleaning device includes a laser beam configured in line or spot form, that is to say not covering the entirety of the optical surface to be cleaned, and means for deviating the rays of that beam toward the optical surface, as well as second movement means configured to modify the position of the deviation means and thus to sweep the optical surface.

Also, the cleaning device may include means for confining the laser beam disposed between the end piece and the optical surface, so that the laser beam is not able to propagate in a direction other than that leading to the optical surface and not able to risk causing damage to a third party. In particular the confinement means may be configured, in an active position of the end piece and/or the optical surface, to conceal from a third party the end piece and the optical surface. Thus when cleaning the optical surface by means of the laser beam, the laser beam is hidden behind the confinement means in order to prevent a third party or another road user from being disturbed by said beam.

According to another feature of the invention, the optical sensor includes at least one detection cell adapted to detect electromagnetic radiation passing through the optical surface and means for preserving the sensitivity of at least one detection cell vis à vis the laser beam emitted by the emission source. The detection cell or cells is or are preferably sensitive in the region of wavelengths visible to the human eye and/or in the infrared region.

These means for preserving the sensitivity of at least one detection cell may include at least one optical fiber disposed between the optical surface and at least one detection cell. The range of absorption wavelengths of the optical fiber preferably covers the range of wavelengths of the laser beam targeted on the optical surface. Alternatively, the preservation means include an optical blocking member disposed between the optical surface and at least one detection cell, configured to stop propagation of the laser beam in the optical sensor during the cleaning operation. Alternatively, the preservation means include means for pivoting at least one detection cell in the optical sensor so as to turn the detection cell or cells away from the optical surface when the latter is cleaned by the laser beam.

According to another feature of the invention, a control module is connected to at least one source for emitting a laser beam and to the first means for moving the relative position of the end piece. In particular, the control module may be configured to control both a source for emitting a laser beam and the relative movement of the end piece with respect to the optical surface of the optical sensor.

According to one feature of the invention, the source for emitting the laser beam is configured for emit laser beams with different wavelengths, in particular to adapt the wavelength of the laser beam emitted to suit the type of dirt present on the optical surface to be cleaned. In this context the cleaning device may include a plurality of laser beam emission sources the wavelengths of which are different, each emission source including means for guiding its laser beam onto at least a part of the optical surface of the optical sensor. It should be noted that the laser beams emitted by the various emission sources may be guided through the same optical fiber. To this end, the guide means may include an optical switch enabling optical connection to the optical fiber of one and/or another emission source.

According to another feature of the invention, the laser emission source and the guide means are configured to illuminate the optical surface with a laser beam the fluence of which is equal to or less than a threshold value. Here this threshold value corresponds to the maximum energy not to be exceeded so as not to degrade the optical surface. It is predefined and depends on the material covering the optical surface. The threshold value is for example 28 $J \cdot cm^{-2}$. The power of the laser beam may of course be chosen as a function of the nature of the dirt that it is wished to remove from the optical surface. The power of the laser beam may in particular be chosen so as to remove the dirt by an ablation phenomenon or by plasma shock.

The invention also relates to a motor vehicle including a cleaning device as described hereinabove.

The present invention also concerns a method of cleaning the optical surface of an optical sensor using a cleaning device as described hereinabove employing a step of the control module activating a laser emission source and the first means for moving the relative position of the end piece so as to illuminate the optical surface with a laser beam.

During the activation step the first movement means may controlled so as to move the laser beam over the optical surface.

Prior to the activation step the optical sensor may acquire a first reference image followed by the acquisition by said optical sensor of a second reference image and the contrast difference between the first and second reference images may be calculated, the activation step being triggered if said difference exceeds a predetermined threshold value.

During the activation step the control module may move the laser beam only over the zone or zones of the optical surface corresponding to a calculated contrast difference between the first and second images that exceeds a predetermined threshold value.

The cleaning method may include a step of spraying water onto the optical surface before and/or after the activation step described hereinabove.

Other features and advantages of the present invention will become more clearly apparent with the aid of the description and the drawings, in which:

FIGS. 5 and 6 are diagrammatic representations of a fourth embodiment of a device according to the invention for cleaning the optical surface of an optical sensor, in which the shape of the laser beam projected onto the surface to be cleaned has been configured in a particular manner;

FIG. 7 is a diagrammatic representation of a fifth embodiment of a device according to the invention for cleaning the optical surface of an optical sensor that differs from the embodiment from FIG. 1 by the addition of confinement means aiming to prevent the propagation of the laser rays otherwise than onto the optical surface to be cleaned;

FIG. 7A is a diagrammatic representation of the cleaning device shown in FIG. 7, in a passive position;

Figure 9:
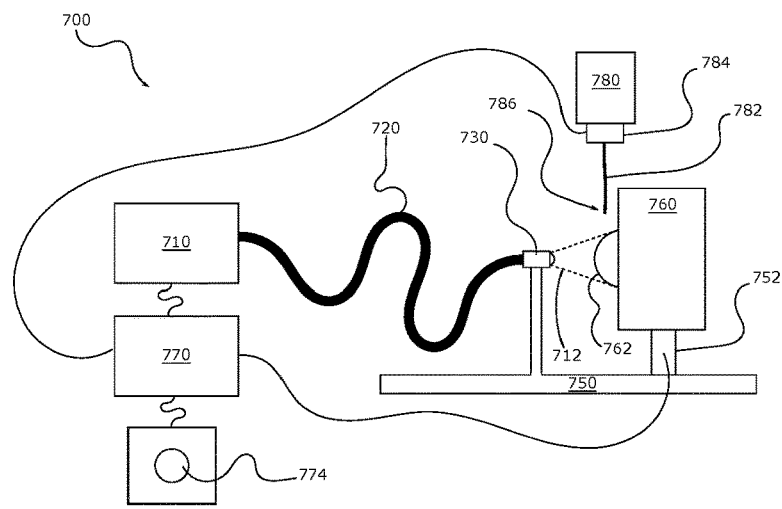
Figure 10:
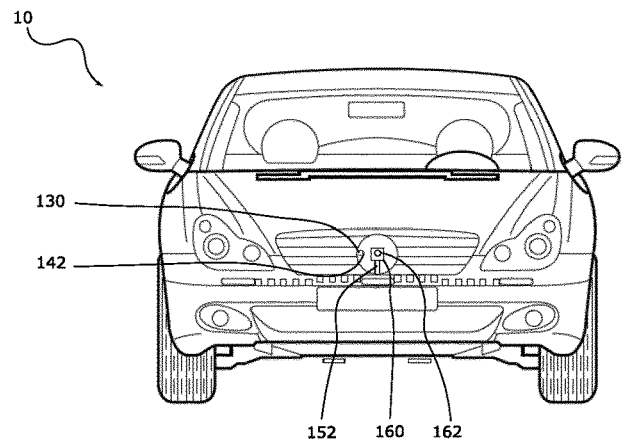

FIG. 9 is a diagrammatic representation of a seventh embodiment of a device according to the invention for cleaning the optical surface of an optical sensor, that differs from the preceding one by the addition of means for spraying an aqueous solution onto the optical surface to be cleaned, used in addition to the emission of the laser beam onto that optical surface; and FIG. 10 is a diagrammatic front view of a motor vehicle, in which an optical sensor and its optical surface to be cleaned by a cleaning device according to the invention have been rendered visible.

The aim of the invention is to propose a device for cleaning the optical surface of an optical sensor for a motor vehicle that is simpler to user, lighter in weight and easier to integrate into a motor vehicle.

The device for cleaning the optical surface is described with reference to a plurality of embodiments and with reference to FIGS. 1 to 9, and it is to be noted that references including identical units and tens digits designate elements common to the various embodiments of the invention described hereinafter.

Figure 1:
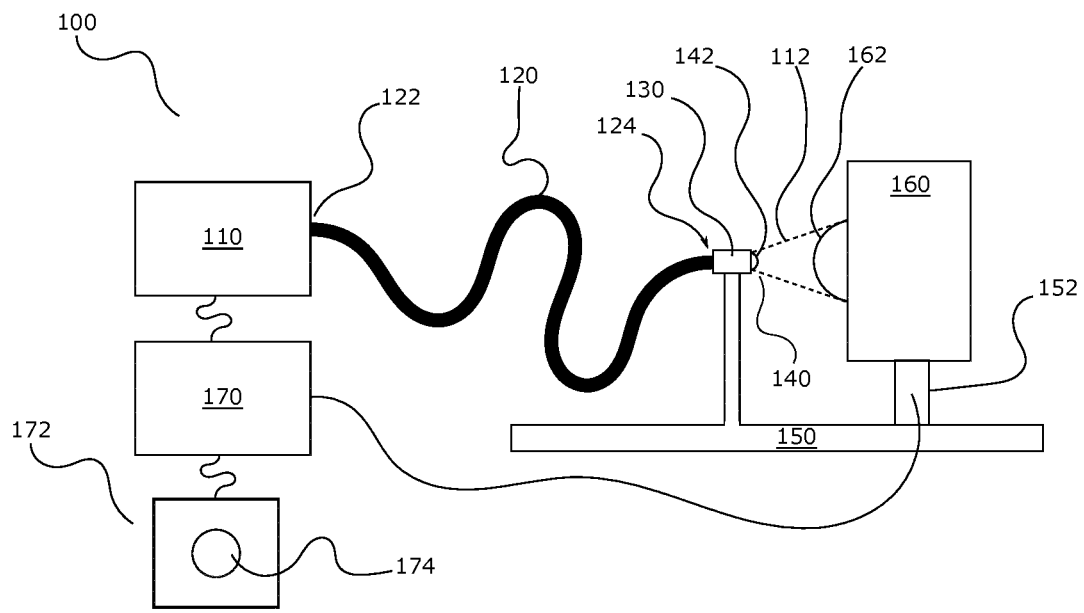
FIG. 1 is a diagrammatic representation of a first embodiment of a device according to the invention for cleaning the optical surface of an optical sensor, in an active position.
Figure 2:
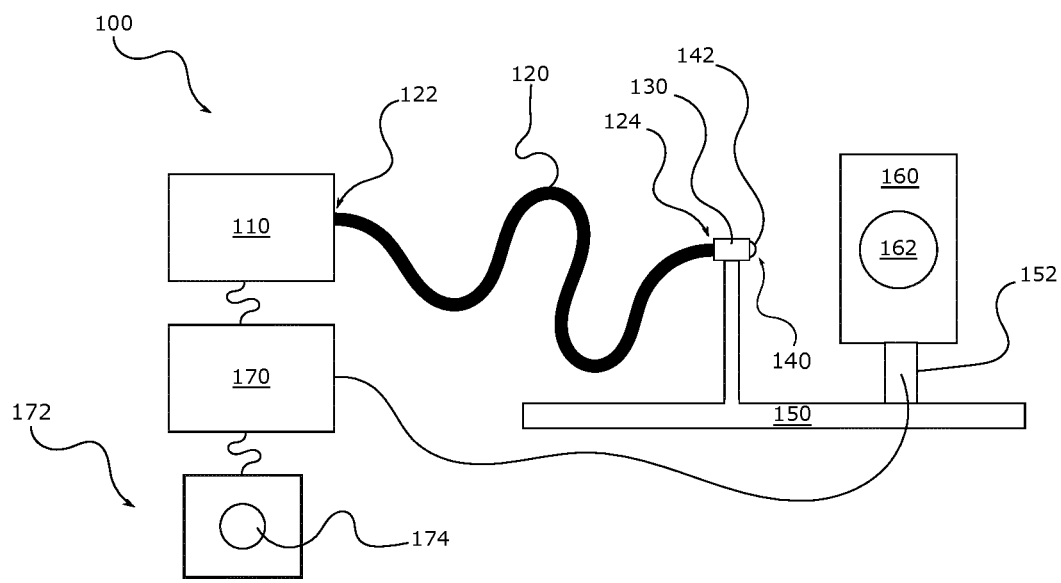
FIG. 2 is a diagrammatic representation of the first embodiment of a cleaning device according to the invention, in a passive position, obtained by rotation of the optical sensor and of the associated optical surface.

FIG. 1 shows a first embodiment of a cleaning device 100 according to the invention. According to this example, the cleaning device includes a source 110 of Ytterbium laser type for emitting a laser beam 112 the wavelength of which is between 200 nm and 1200 nm here. The wavelength of the laser beam emitted may be defined in a definitive manner at the design stage and also when the cleaning device is used on the vehicle, and an emission source could be provided that can be configured in use to modify the wavelengths of the rays emitted as required. According to the present example, the emission source 110 is a laser source emitting a beam the wavelength of which is 1 060 nm, at a frequency of 20 kHz. The emission source 110 is optically coupled to an optical fiber 120 in such a manner as to enable the laser beam 112 to propagate in the optical fiber from a first end 122 of the optical fiber, adjacent to the emission source 110, to a second end 124. The second end of the optical fiber terminates in an end piece 130 retaining a device 140 for shaping the laser beam emitted at the level of the second end 124 of the optical fiber. According to the present example, the shaping device includes at least one optical lens 142 configured to cause the laser beam to diverge in such a manner as to increase its solid angle.

By way of nonlimiting example the shaping device could include a collimator and at least one lens adapted to adjust, that is to say to straighten and to concentrate, the shape of the laser beam emitted as a spot the size of the optical surface 162 to be cleaned.

The emission source 110 may be arranged at a distance from the area in which the optical sensor is placed, in particular thanks to the presence of the optical fiber 120 conveying the rays emitted by the emission source to the end piece 130, disposed in the vicinity of the optical sensor. As a result, the emission source may be disposed in a protected zone, and for example in the trunk of the vehicle, whereas the optical sensor is disposed on the front face of the vehicle, as shown by way of example in FIG. 10.

The end piece 130 is retained on a support 150 so that the laser beam 112 illuminates an optical sensor 160 also mounted on the support 150. The end piece 130 and the optical sensor 160 could instead be retained on separate supports, but it is advantageous to provide a common support as shown in order to facilitate accurate positioning of the optical sensor and of the laser beam emission end piece relative to one another. To be more precise, the optical sensor 160 is retained on the support by means of a motorized pivot connection 152 enabling the optical sensor to be pivoted between an active position represented in FIG. 1 and a passive position illustrated in FIG. 2. In the active position, the optical sensor 160 is oriented so that its optical surface 162 faces toward the end piece 130 through which the laser beam is emitted, so that the entirety of its optical surface 162 can be illuminated by the laser beam 112. Conversely, in the passive position, the optical surface 162 is moved away from the laser beam to be oriented toward a scene to be observed, such as for example the road to be taken by the motor vehicle. It is then clear that the optical sensor is disposed primarily in the passive position, which is therefore more particularly a passive position with respect to cleaning, primarily to be able to monitor the road scene in the vicinity of the vehicle.

The motorized pivot connection 152 is controlled by a control module 170. The control module 170 is also connected to the emission source 110 and to an activation member 172. When the activation member 172 is activated, the control module generates a control instruction to the actuators of the motorized pivot connection 152 in order to cause the optical sensor 160 to pivot from its passive position to its active position, and simultaneously generates an instruction to activate the emission source 110, where appropriate subject to completion of the pivoting of the optical sensor. Conversely, when the activation member 172 is deactivated, the control unit generates instructions for deactivating the emission source and for pivoting the optical sensor 160 from its active position to its passive position, again by means of the motorized pivot connection 152. By way of example, the activation member may be a pushbutton 174 actuated by a user wishing to clean the optical surface 162 of the optical sensor with the aid of the laser beam 112.

As described hereinafter, confinement means may be employed when the laser beam used for the cleaning operation has a power that is potentially harmful to a third party. Here the motorized pivot connection 152 is adapted to bring the optical surface to be cleaned to face the end piece 130 in a zone protected by the confinement means. Depending on the configuration of the confinement means, the optical sensor may be rendered mobile from the passive position to the active position by means complementary to those formed by the motorized pivot connection.

The light source may consist in a pulsed emission source or a continuous emission source, and the action on dirt present on the optical surface may consist in a plasma shock or laser ablation physical phenomenon.

By way of nonlimiting example, the laser emission source may have the following characteristics:

| | |
|---|---|
| Density [kW/cm$^2$] | 530 |
| Energy [mJ] | 0.935 |
| Peak power [W] | 9 350 |
| Average power [W] | 18.7 |
| Fluence [J/cm$^2$] | 2.65 |
| Frequency [kHz] | 20 |
| Pulse duration [ns] | 100 |

Figure 3:
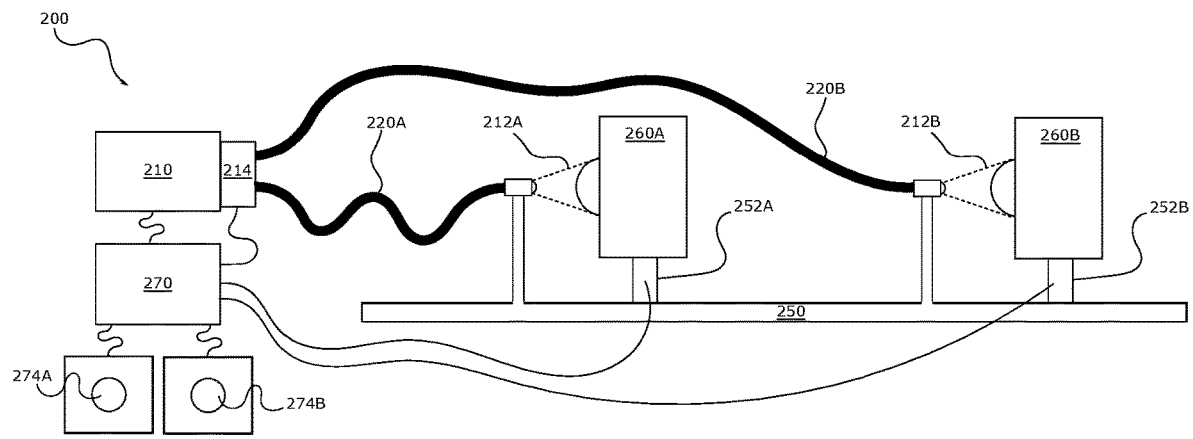
FIG. 3 is a diagrammatic representation of a second embodiment of a device according to the invention for cleaning the optical surface of an optical sensor that differs in particular from the embodiment from FIG. 1 in that it includes a plurality of means for guiding the laser beam and a plurality of optical surfaces to be cleaned.

A second embodiment of the invention is shown in FIG. 3. According to this second embodiment, the cleaning device 200 is distinguished in particular from the previous embodiment in that it includes a second optical fiber 220B coupled to the emission source 210 in addition to a first optical fiber 220A and in that each optical fiber is associated with the emission of a laser beam 212A, 212B onto an optical surface of an optical sensor 260A, 260B that is specifically associated with it.

To be more precise, the optical fibers 220A and 220B are coupled to the same emission source 210 by means of an optical switch 214 enabling the laser beam emitted by the emission source 210 to propagate in one optical fiber or simultaneously in the two optical fibers. It is to be noted that the first optical fiber 220A and the second optical fiber 220B are identical to the optical fiber 120 described hereinabove. Each optical fiber also includes at its free end an end piece retaining a lens. The end pieces are retained on a support 250 in such a manner that each end piece is able to illuminate the entirety of the optical surface of the optical sensor that is associated with it when that optical sensor is in the active position. As previously, each optical sensor 260A and 260B retained on the support 250 by means of a respective motorized pivot connection 252A and 252B enabling each optical sensor 260A and 260B to move from an active position to a passive position or vice versa. The motorized pivot connections are controlled by a control module 270. The control module 270 is also connected to the emission source 210 and to the optical switch 214. The control module is also connected to two separate pushbuttons 274A and 274B. Activation of each pushbutton enables a user to clean the optical surface of an optical sensor by means of a laser beam 212A, 212B as described hereinabove. The same source 210 for emitting a laser beam may therefore and advantageously be used to clean the optical surface of a plurality of optical sensors, simultaneously or one after the other. The invention makes possible a significant space and weight saving in a vehicle including a plurality of optical sensors.

Figure 4:
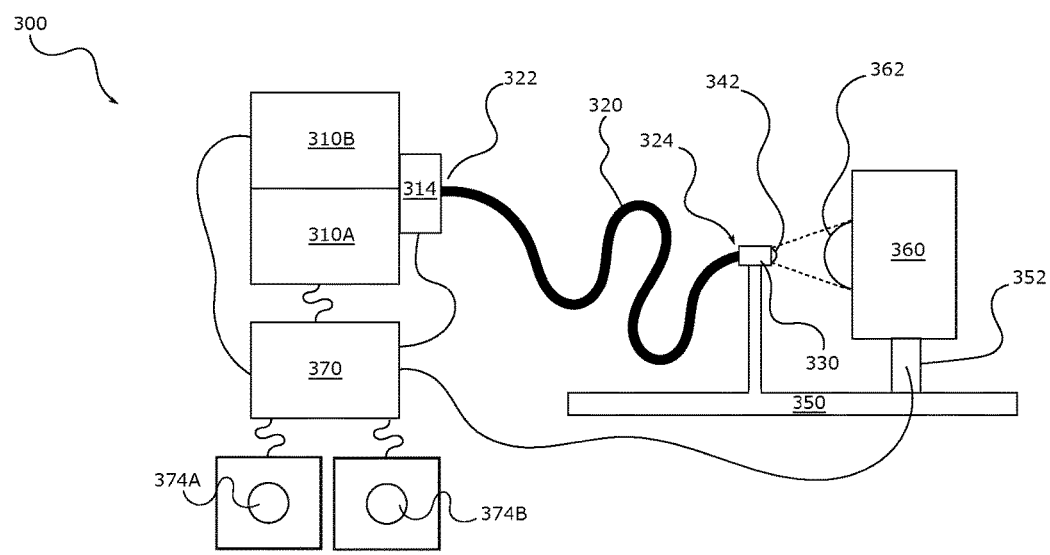
FIG. 4 is a diagrammatic representation of a third embodiment of a device according to the invention for cleaning the optical surface of an optical sensor, that differs in particular form the embodiment from FIG. 1 in that it includes two different laser emission sources, in order to modulate the wavelength of the beam emitted onto the optical surface.

FIG. 4 shows another embodiment of a cleaning device 300 according to the invention. This third embodiment differs from the first in that it includes two separate emission sources. To be more precise, the first end 322 of the optical fiber 320 is coupled to the output of an optical switch 314 the input of which is moreover coupled to two emission sources 310A and 310B. Each emission source is configured to emit a laser beam in a range of different wavelengths. By way of example, the parameters of the first emission source 310A are set to emit a first laser beam at 1 200 nm, while the second emission source 310B has its parameters set to emit a second laser beam at 200 nm. In particular the first emission source could have its parameters set to emit a wavelength greater than 500 nm so as in particular to generate a thermal action via the emission of infrared rays, with the parameters of the second emission source set for emissions at a wavelength less than 500 nm in such a manner as to generate an in particular chemical action via the emission of ultraviolet rays. Likewise, it is possible to use a pulsed emission source and a continuous emission source so as to vary the emission power as a function of the dirt detected on the optical surface.

The cleaning device 300 also includes a control module 370 connected to the optical switch 314, to the emission sources 310A and 310B, to a motorized pivot connection 352 as described hereinabove and to two separate pushbuttons 374A and 374B. The control module 370 is configured to actuate one or the other of the emission sources as a function of activation of one or the other of the pushbuttons and to orient the optical switch 314 so as to couple the laser beam emitted by the activated emission source into the optical fiber 320. The control module 370 is also configured to command the motorized pivot connection 352 to pivot the optical sensor 360 from a passive position to an active position when one of the pushbuttons is actuated in order for the beam emitted at the level of the emission end piece 330 to be directed toward the optical surface of the optical sensor. In the present embodiment, the pushbutton 374A commands activation of the emission source 310A. At the end of a particular time, deemed necessary for cleaning the optical surface, the emission sources are deactivated and the optical sensor is returned to the passive cleaning position, that is to say in the position for carrying out operations to detect the environment of the vehicle, with a cleaned optical surface. Of course, when neither pushbutton is activated the control module leaves the emission sources 310A and 310B inactive and the optical sensor 360 is left in its passive position. This third embodiment advantageously enables a user to clean the optical surface 362 of the optical sensor with two laser beams with different wavelengths. The invention therefore enables a user to effect more appropriate cleaning as a function of the nature of the layer of dirt covering the optical surface of the sensor. In the present embodiment, the first emission source 310A is configured to emit a laser beam in a range of wavelengths corresponding to the range of absorption wavelengths from 500 nm to 1200 nm, whereas the laser beam emitted by the second emission source 310B corresponds to a range of absorption wavelengths from 250 nm to 500 nm, 250 nm being a wavelength in the ultraviolet that enables chemical action on pollution. Depending on the nature of the layer of dirt covering the optical surface 362, the user is therefore able to select one or the other emission source, or indeed to combine the two, in order to ensure better absorption of the laser beam by the layer of dirt to enable faster and more effective cleaning of the optical surface.

FIG. 5 shows another embodiment of a cleaning device 400 according to the invention. This fourth embodiment is distinguished from the first in that the end piece 430, disposed at the second end 424 of the optical fiber 420, retains an optical lens 442 configured to cause to converge onto the optical surface 462 a laser beam 412 the shape of a parallelogram. In the example shown the shaping device 442 includes a mobile mirror 464 by means of which the laser beam 412 is projected onto the optical surface and the movement in rotation of which generates sweeping of the optical surface. As shown in FIG. 6, for a particular position of the mobile mirror, the parallelepiped shape of the laser beam 412 extends the full height of the optical surface 462 of the optical sensor 460 but extends partly across its width. The laser beam 412 therefore delimits a shape the projection of which in a plane perpendicular to the general direction of the laser beam is rectangular. By way of example, it may be envisaged that the dimensions of this rectangular projection on the optical surface 462 are 15 mm by 100 µm. In other words, the turned on laser beam 412 at this time illuminates only a part of the optical surface of the optical sensor. The mobile mirror 464 enables sweeping the whole of the optical surface 462 with this rectangular laser beam in one direction and then the other, as a function of the direction of rotation of the mobile mirror. It is clear that there could alternatively be proposed a laser beam of spot shape and a shaping device that includes one or more mobile mirrors offering two degrees of freedom in their movement. In order to perform this sweeping of the optical surface, the control module 470 is also connected to the pivot means formed by the mobile mirror or mirrors 464. When the pushbutton 474 is activated by a user the control module 470 is configured to pivot the motorized pivot connection 452 in such a manner as to move the optical sensor 460 from a passive position to an active position, and then to activate the emission source 410 and to command pivoting of the mobile mirror 464 so that the laser beam sweeps the entirety of the optical surface 462. As before, when the activation member 472 is deactivated or the control module is configured to deactivate the emission source after a particular cleaning time lapse and to pivot the optical sensor 460 from its active position to its passive position. This fourth embodiment advantageously makes it possible to focus the laser beam onto a smaller surface to increase its power and to enable more effective cleaning of the optical surface.

FIG. 7 shows in more detail in a fifth embodiment of a cleaning device 500 according to the invention, the means 554 for confining the laser beam 512 emitted by the emission source 510, it being understood that this kind of confinement means could be employed in each of the embodiments described above. To be more precise, the confinement means 554 are arranged at the level of the end piece 530 and are configured to confine the laser beam at the level of the support 550 when the optical sensor 560 is in the active position. In FIG. 7 there has been rendered visible a wall 554 of these confinement means secured to the support, the wall 554 extending in a direction substantially perpendicular to the base 551 of the support to which the end piece 530 and the optical sensor 560 are secured. In particular, this wall 554 extends the full height of the optical sensor and has a length greater than the distance between the end piece and the optical surface so as to mask from a third party the end piece 530 and the optical surface 562 of the optical sensor when the laser beam is cleaning the optical surface, the components masked by the wall being represented in dashed line to make the figures easier to read. The wall 554 is arranged so that the end piece is systematically masked and so that, when the optical sensor 560 is in a passive cleaning position (visible in FIG. 7A), the end of the wall 554 does not appear in the detection field of the optical sensor. It is clear that the confinement means advantageously take the form of a black box to block the laser beams that can damage the third party in all directions and that only one wall has been shown to facilitate the diagrammatic representation. A flexible wall part could in particular be provided enabling pivoting of the optical sensor from the passive position, in which the optical surface is outside these confinement means, to the active position, in which the optical surface is inside these confinement means.

Figure 8:
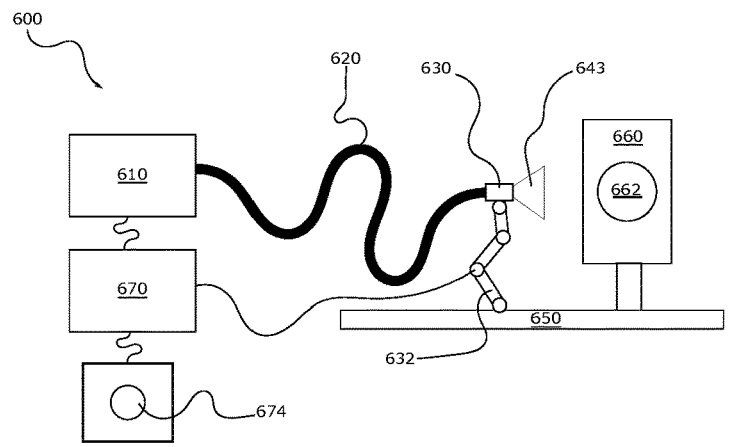
FIG. 8 is a diagrammatic representation of a sixth embodiment of a device according to the invention for cleaning the optical surface of an optical sensor, that differs from the embodiment from FIG. 1 in the presence of motorized means for deployment of the end piece emitting the laser beam in the direction of the optical surface to be cleaned.

FIG. 8 shows another embodiment of a cleaning device 600 according to the invention. This sixth embodiment is distinguished from the first embodiment in that the optical sensor 660 is fixedly secured to the support 650 and in that the end piece 630 is secured to the end of a motorized deployable arm 632 controlled by the control module 670. The modification of the relative position of the end piece with respect to the optical surface is therefore ensured by movement of the end piece, in contrast to what is described above, where it was effected by movement of the optical surface. There may be provided in particular telescopic deployment of the end piece 630, using a motorized telescopic arm that is configured to move the end piece 630 at a speed of 5 mm/s between a passive position situated on the side of the optical surface 662 (visible in FIG. 8) to an active position situated in front of the optical surface. To be more precise, the motorized arm 632 is configured to move the end piece 630 in front of the optical surface 662 so that the laser beam sweeps the entirety of the optical surface 662 in order to clean the entirety of said surface. When the activation member 674 is activated, the control module 670 is configured to command the motorized deployable arm 632 to move the end piece 630 from its passive position to its active position and then to activate the emission source 610. Following a particular time lapse, or when the activation member 674 is deactivated, the control unit is configured to deactivate the emission source 610 and to retract the motorized arm 632 from its active position to its passive position so that the end piece 630 is not visible to the optical sensor 660.

A confinement device specific to this embodiment, in which it is the end piece of the emission source that is moved, may be implemented as shown in FIG. 8. A conical membrane 643 is disposed around the end piece 630 and the associated optical lens to be pressed against the optical sensor 660 around the optical surface 662 to be cleaned. When the emission source is activated, the rays exiting the end piece are confined until they come into contact with the optical surface.

FIG. 9 shows another embodiment of a cleaning device 700 according to the invention. This seventh embodiment includes in addition to the first embodiment described above a tank 780 containing an aqueous solution. The tank 780 is connected to a distribution channel 782 by means of a motorized valve 784 and the free end 786 of the channel is arranged in the vicinity of the optical surface 762 when the optical sensor is in the active position. The control module 770 is also connected to the motorized valve 784. The control module 770 is configured to command the motorized valve to apply one or more drops of water onto the optical surface 762 before or after activation of the emission source 710. This embodiment in particular makes it possible, when water is sprayed onto the optical surface before the projection of a laser beam, to create a phenomenon of cavitation at the level of the water drop or drops present on the optical surface 762, favoring more effective cleaning of the optical surface.

The foregoing description explains clearly how one or the other of the embodiments of the invention makes it possible to achieve the objectives set for it and in particular to propose a device for cleaning an optical surface by the emission and the projection of a laser beam onto that optical surface that enables optimum cleaning without it being necessary for the associated cleaning means to have penalizing dimensions.

However the invention is not limited to the embodiments described above and the embodiments described hereinabove may be combined with one another in order to form on the one hand new embodiments not described explicitly and on the other hand variants of which a few non-exhaustive examples are given below.

One of the control modules described above may integrate a processor and a memory unit in order to enable an algorithm stored beforehand in the memory unit to effect the cleaning of the optical surface of the sensor in a regular manner, without intervention by a user. By way of example, the algorithm may command the cleaning of the optical sensor once a week or once a month.

According to another alternative, the control module described above may be connected to the optical sensor in such a manner as to be able to acquire in real time images captured by said sensor and in such a manner as to control accordingly the activation of the emission means and the relative movement of the end piece with respect to the optical surface, in particular as a function of the detection of dirt on the optical surface. As a result, cleaning sequences are effected when necessary, without manual intervention of the driver. The algorithm mentioned above may then be configured to enable the control module to execute the following steps:

acquisition by the optical sensor of a first reference image;
after a given time period, acquisition by the optical sensor of a second reference image;
calculation by the control module of the contrast difference between the first reference image and the second reference image; and
if that difference exceeds a predetermined threshold value, activation of the cleaning device as described above so as to clean the optical surface of the optical sensor by a plasma shock or laser ablation physical phenomenon.

In one variant, the control module may orient the optical sensor toward a test pattern at the time of acquisition of the reference images in order to enable more accurate calculation of the contrast difference over time of the images acquired by the optical sensor.

In another variant, the control module is configured to apply the laser beam to the optical surface of the optical sensor in only the zone or zones of the optical surface corresponding to a calculated contrast difference between the first reference image and the second reference image exceeding a predetermined threshold value. In this variant, the cleaning device is configured to project the laser beam onto a part of the optical face of the sensor, as described in particular in the fourth embodiment described above. It is to be noted that the laser beam may equally be projected with a different shape, such as for example the shape of a spot, in order to enable more precise cleaning of the optical surface.

In another variant, the optical surface to be cleaned may be covered with a coating, in particular in the case of using infrared rays. This coating prevents these rays burning the optical surface. As a result, the rays coming into contact with the lens act on all the dirt encountered before impacting on the coating of the optical surface and have been absorbed by the time they encounter the appropriate coating. The emission wavelength of the laser could be chosen as a function of the type of material used as the coating.

The invention claimed is:

1. A device for cleaning an optical surface of an optical sensor for a motor vehicle, comprising:
   an emission source for emitting a laser beam;
   a means for guiding said laser beam onto from the emission source to an end piece from which the laser beam is emitted onto at least a part of the optical surface so as to clean the optical surface;
   a common mechanism support for the end piece and the optical sensor, the mechanical support retaining the end piece on the motor vehicle and orienting the end piece relative to the optical surface to enable the cleaning of the optical surface; and
   a first means for moving a relative position of the end piece with respect to the optical surface of the optical sensor,
   wherein the first means for moving are configured to pivot the end piece and/or the optical surface reversibly between a passive position in which the end piece is not facing the optical surface and an active position in which the end piece faces the optical surface to be cleaned, and
   wherein a power and a wavelength of the laser beam are determined based on a type of dirt to be removed from the optical surface.

2. The cleaning device as claimed in claim 1, wherein the end piece includes a device for shaping the laser beam emitted by the emission source for projection thereof onto at least a part of the optical surface of the optical sensor.

3. The cleaning device as claimed in claim 1, further comprising means for confining the laser beam disposed between the end piece and the optical surface.

4. The cleaning device as claimed in claim 1, wherein the optical sensor includes at least one detection cell adapted to detect electromagnetic radiation passing through the optical surface and means for preserving the sensitivity of at least one detection cell vis à vis the laser beam emitted by the emission source.

5. The cleaning device as claimed in claim 1, further comprising a control module connected to the emission source and to the first means for moving the relative position of the end piece.

6. The cleaning device as claimed in claim 5, wherein the control module is configured to control both the emission source and the relative movement of the end piece with respect to the optical surface of the optical sensor.

7. The cleaning device as claimed in claim 1, wherein the emission source is configured for emitting laser beams with different wavelengths.

8. The cleaning device as claimed in claim 1, wherein the emission source is a first emission source, wherein the cleaning device comprises a second emission source for emitting a second laser beam having a different wavelength than the laser beam emitted by the first emission source, and wherein both the first emission source and the second emission source are connected to said means for guiding.

9. The cleaning device as claimed in claim 1, wherein the emission source and the guide means are configured to illuminate the optical surface with a laser beam the fluence of which is equal to or less than a threshold value.

10. A method of cleaning an optical surface of an optical sensor using a cleaning device as claimed in claim 1, the method comprising:
    a step of activating both the emission source and the first means for moving the relative position of the end piece so as to illuminate the optical surface with a laser beam.

11. The cleaning method as claimed in claim 10, wherein during the activation step, the first means for moving are controlled so as to move the laser beam over the optical surface.

12. The cleaning method as claimed in claim 10, wherein prior to the activation step, the optical sensor acquires a first reference image followed by acquisition by the optical sensor of a second reference image, and wherein the method comprises calculating a contrast difference between the first and second reference images.

13. The cleaning method as claimed in claim 12, wherein during the activation step, the laser beam is moved only over the zone or zones of the optical surface wherein a calculated contrast difference between the first and second images exceeds a predetermined threshold value.

* * * * *